United States Patent [19]

Berkstresser et al.

[11] Patent Number: 4,550,256
[45] Date of Patent: Oct. 29, 1985

[54] VISUAL DISPLAY SYSTEM UTILIZING HIGH LUMINOSITY SINGLE CRYSTAL GARNET MATERIAL

[75] Inventors: George W. Berkstresser, Bridgewater; Tai-Chan D. Huo; Joseph Shmulovich, both of New Providence, all of N.J.

[73] Assignee: AT&T Bell Laboratories, Murray Hill, N.J.

[21] Appl. No.: 542,391

[22] Filed: Oct. 17, 1983

[51] Int. Cl.$^4$ ............................................. G01J 1/58
[52] U.S. Cl. ............................. 250/483.1; 250/486.1
[58] Field of Search .......................... 250/483.1, 486.1

[56] References Cited

PUBLICATIONS

Chemical Abstracts, vol. 81 (1974), p. 421.
Appl. Phys. Lett. 37(5), Sep. 1, 1980, "Epitaxially Grown Monocrystalline Garnet Cathode Ray Tube Phosphor Screens", by J. M. Robertson et al., pp. 471-472.
Appl. Phys. Lett. 38(9), May 1, 1981, "Saturation Effects of Cathodoluminescence in Rare-Earth Activated Epitaxial $Y_3Al_5O_{12}$ Layer", by W. F. van der Weg et al., pp. 705-707.
The Measurement of Appearance, by Richard S. Hunter, John Wiley & Son, New York, 1975, pp. 80-97.
Journal of Crystal Growth 17 (1972), "The Growth of Magnetic Garnets by Liquid Phase Epitaxy", by S. L. Blank et al., pp. 302-311.
IEEE Transactions on Magnetics, vol. MAG-12, No. 4, Jul. 1976, "Bubble Domain Memory Materials", by J. W. Nielsen, pp. 327-345.
Philips Journal of Research, vol. 35, No. 6, 1980, "Thin Single Crystalline Phosphor Layers Grown by Liquid Phase Epitaxy", by J. M. Robertson et al., pp. 354-371.
The Journal of Chemical Physics, vol. 47, No. 12, Dec. 15, 1967 "Investigation of Some $Ce^{3+}$-Activated Phosphors" by G. Blasse and A. Bril, pp. 5139-5145.
Philips Res. Repts. 22, 1967, "Investigations of $Tb^{3+}$-Activated Phosphors" by G. Blasse et al., pp. 481-504.

Primary Examiner—James R. Hoffman
Attorney, Agent, or Firm—Eugen E. Pacher

[57] ABSTRACT

The disclosed display apparatus comprises a novel high intensity broadband-emitting phosphor. The phosphor is single crystal material in which Tb acts as sensitizer of Ce, the activator. The composition of the phosphor is $(Y_{3-x-y-z}Ce_xTb_yRE_z)Al_{5-w}X_wO_{12}$, where RE is one or more 4f-type rare earths other than Y, Ce, and Tb, X is Sc, Ga, or In, and $0 < x \leq 0.06$, $0 < y \leq 0.5$, $0 \leq z \leq 2$, $0 \leq w \leq 3$. In preferred embodiments z and w are either zero, or RE is Lu and X is Ga. The phosphor is typically grown epitaxially by LPE on a $Y_3Al_5O_{12}$ substrate, and has application in a variety of apparatus, including aircraft cockpit head-up displays and flight simulators.

14 Claims, 9 Drawing Figures

Ce: YAG

Tb: YAG

VISUAL DISPLAY SYSTEM UTILIZING HIGH LUMINOSITY SINGLE CRYSTAL GARNET MATERIAL

FIELD OF THE INVENTION

This invention pertains to the field of inorganic phosphors and to visual display systems utilizing such phosphors.

BACKGROUND OF THE INVENTION

This invention concerns visual display devices utilizing inorganic phosphors that emit visible electromagnetic radiation when excited by energetic electrons (cathodoluminescence, CL) or by electromagnetic radiation (photoluminescence, PL), and the discussion herein will be so limited.

Although visual display technology utilizing phosphors, especially cathode ray tube (CRT) technology, is the product of many years of intense effort and is quite mature, there exist numerous potential applications for such displays that are currently unrealized or only imperfectly realized. These applications share a common requirement of high phosphor luminosity. Among these applications are projection displays, high resolution displays, and high brightness displays for viewing in the presence of high ambient light levels, e.g., avionic displays, such as head-up displays and flight simulators. Although novel technologies are being developed for these and other applications, e.g., holographic combiners, that require intense narrow-band luminescence emission, the existence of a well-developed CRT display technology based on broadband emission suggests that development of high intensity broadband phosphors might be an economically advantageous approach to the realization of such devices.

Prior art display devices often employ powder phosphors. These phosphors are typically subject to shortcomings such as poor thermal properties, degradation of efficiency with dose, and limited resolution. Many of these shortcomings of prior art powder phosphor targets can be alleviated by the use of single crystal phosphor targets, typically consisting of a monolithic slab of crystalline phosphor that is bonded at the atomic level to a single crystal faceplate. Such epitaxial targets are typically grown by liquid phase epitaxy (LPE). See, for instance, J. M. Robertson et al, *Philips Journal of Research*, Vol. 35, pp. 354–371, (1980). Single crystal targets have been found to be capable of withstanding input power densities in excess of $10^{10}$ W/m$^2$ without showing measurable degradation, and can have improved resolution as compared to powder phosphor targets.

The principles of luminescence in inorganic solids are well known and not be reviewed herein in detail. (See, for instance, *Luminescence of Inorganic Solids*, P. Goldberg, Editor, Academic Press, New York (1966), especially pp. 2–52.) Briefly, luminescent emission from inorganic solids involves optical transitions between electronic states characteristic of the radiating substance. The radiating entity, e.g., an atom occupying a crystal lattice site, is raised into an excited state through interaction with the excitation means, e.g., a UV photon or an energetic electron, followed by the entity's return to the electronic ground state, typically by a series of transitions comprising at least one radiative transition involving emission of a photon of wavelength in the visible part of the spectrum.

Luminescence of most inorganic solids involves impurities, e.g., dopants, or structural defects. If the impurity or defect is the radiation-emitting entity, it is referred to as an "activator," and we will follow this usage herein. The presence of a second species of impurity or defect in the activator-containing host material often affects the emission characteristics of the material. If the second species absorbs energy from the exciting means and transfers part of the energy to the activator, with the reverse energy transfer being small, then the luminescent efficiency of the material is typically enhanced. In such a case, the second species is generally referred to as a "sensitizer," and we will also follow this usage herein.

Although single crystal phosphors tend to have luminescent properties whose gross features are similar to those of powder phosphors of the same composition, the detailed features tend to differ in a generally unpredictable manner. Several reasons exist for this. For instance, since a powder phosphor is typically formed by a different process than the single crystal phosphor, chemical differences (e.g., different phases) may exist. Also, the crystal lattice in powder particles can be expected to be heavily strained, with a high defect density, whereas the lattice of a single crystal phosphor typically is relatively strain free and free of defects. Since luminescence is quite sensitive to the details of the crystal field, these lattice differences can lead to significant differences in the luminescence.

One of the materials whose luminescent properties have been investigated extensively is $Y_3Al_5O_{12}$, yttrium aluminum garnet (YAG). In particular, rare earth doped (including $Ce^{3+}$ as well as $Tb^{3+}$ doped) YAG has been investigated. (See, for instance, D. J. Robbins et al, *Physical Review* B, Vol. 19(2), pp. 1254–1269, (1979).) The energy transfer from different sensitizer species to a variety of activator species was also studied in YAG. In particular, the transfer from $Ce^{3+}$ to $Tb^{3+}$ in YAG powder has been studied (G. Blasse and A. Brill, *The Journal of Chemical Physics*, Vol. 47(6), pp. 1920–1926, (1967)). Also, YAG phosphor doped with Ce and Tb was prepared in powder form by calcination. *Chemical Abstracts*, Vol. 81, 97658d, page 421 (1974) and ibid., 97659e. Japanese Pat. No. 50-97590, Y. Fukuda et al, disclosure date Aug. 2, 1975, also discloses powder YAG phosphor doped with Ce and Tb, and teaches that addition of Tb to Ce-containing YAG resulted in increased brightness. In particular, in indicates that the brightness improvement is due to the additional emission from Tb, and that the emission time of Ce is not increased due to the presence of Tb.

Epitaxially grown monocrystalline Ce- or Tb-doped YAG CRT phosphor screens were also investigated (e.g., J. M. Robertson and M. W. van Tol, *Applied Physics Letters*, Vol. 37(5), pp. 471–472, (1980)). Saturation effects of the CL in such layers were also determined (e.g., W. F. van der Weg and M. W. van Tol, *Applied Physics Letters*, Vol. 38(9), pp. 705–707 (1981)).

Because of the great potential of high brightness visual displays, a phosphor with broadband emission that has high conversion efficiency, high power capability, high quench temperature, permits high resolution, and is not subject to substantial degradation is of considerable technological significance. This application discloses such a phosphor.

Definitions

"Yttrium aluminum garnet" or "YAG" is intended herein to include garnet material in which Sc, Ga, or In is substituted for part of Al, and one or more 4f-type rare earths, other than Ce or Tb, are substituted for part of Y. It is also intended to include such material in which equal parts of II/IV elements (e.g., Ca/Si, or Ca/Ge) are substituted for part of Y and Al, respectively.

The "intensity" of luminescent emission (in a given spectral range) from a given species, e.g., Ce, in a phosphor herein is proportional to the total number of photons emitted (in the spectral range) from the phosphor per unit time, under given excitation conditions, typically DC e-beam excitation. If two or more species emit in the spectral range, then the term "intensity of emission from X" or its equivalents implies that the observed total intensity was corrected to yield the intensity of emission from species X, whereas the sum of the various emissions will be referred to as the "total intensity of emission."

The "emission time" of an emitting species X herein is the time, measured from termination of the external excitation, required for the intensity of emission from X to decrease to 5% of the maximum value.

SUMMARY OF THE INVENTION

The inventive visual display system comprises an excitation beam source (electromagnetic radiation or electron beam), beam deflection means, beam amplitude modulation means, and a screen comprising single crystal phosphor material with broad band emission. By "amplitude modulation" we mean herein any deliberate change in the amplitude of the excitation beam, including switching the beam on and off. The inventive phosphor comprises single crystal garnet material comprising $Tb^{3+}$ as sensitizer and $Ce^{3+}$ as activator, the garnet material being substantially of composition $Y_{3-x-y-z}Ce_xTb_yRE_zAl_{5-w}X_wO_{12}$, with $0 < x \leq 0.06$, $0 < y \leq 0.5$, $0 \leq z \leq 2$, and $0 \leq w \leq 3$, with RE being one or more rare earths (4f-type) other than Y, Ce, and Tb, and X being Sc, Ga, or In. Inventive phosphors can also comprise pairs, in equal parts, of a column II and a column IV element (e.g., Ca and Ge or Si). We will not specifically indicate the presence of the II/IV elements.

We have found that the broadband (Ce) emission from single crystal phosphors of the indicated composition has unexpectedly high intensity and long decay time. Typically, the Ce emission intensity in the 480–700 nm spectral range is at least 10% greater, and the Ce emission time at least 10% longer, in phosphors according to the invention than in analogous (i.e., same x, y, and w) Tb-free YAG phosphor identically excited. The observed increase in emission time implies that energy transfer from Tb to Ce occurs in phosphors according to the invention.

In typical embodiments the excitation beam is an electron beam, the screen comprises a single crystal [111] oriented YAG substrate with epitaxial phosphor layer thereon. Preferred phosphor compositions are $Y_{3-x-y}Ce_xTb_yAl_5O_{12}$, with $0.03 \leq y \leq 0.4$, and $0.005 \leq x \leq 0.03$, and $Y_{3-x-y-z}Ce_xTb_yLu_zAl_{5-w}Ga_wO_{12}$, with x and y having the same ranges as above, $0.5 \leq w \leq 3$, and $0.2 \leq z \leq 2$. We find that often good crystalline quality on YAG substrates results if z is about 1.6 times w. This ratio will, however, typically be different if a different substrate is used.

On a YAG substrate, the inventive phosphor is advantageously grown by LPE. In this case, melt temperatures between about 1030° C. and about 1080° C., with growth rates of about 2–6 μm/min, have been found to yield useful results.

DETAILED DESCRIPTION

A central aspect of the invention resides in the novel phosphor, namely, single crystal YAG doped with both cerium and terbium, to be referred to as single crystal Ce:Tb:YAG.

We have made the unexpected discovery that in such material significant energy transfer from Tb to Ce occurs, in contrast to the powder Ce:Tb:YAG case. This transfer results in substantially increased intensity of Ce emission, as compared to single crystal Ce:YAG. Tb thus acts as sensitizer in the inventive phosphor, with Ce being the activator. The Tb-sensitization manifests itself also in increased Ce emission time, as compared to prior art single crystal Ce:YAG and powder Ce:Tb:YAG.

Figure 1:
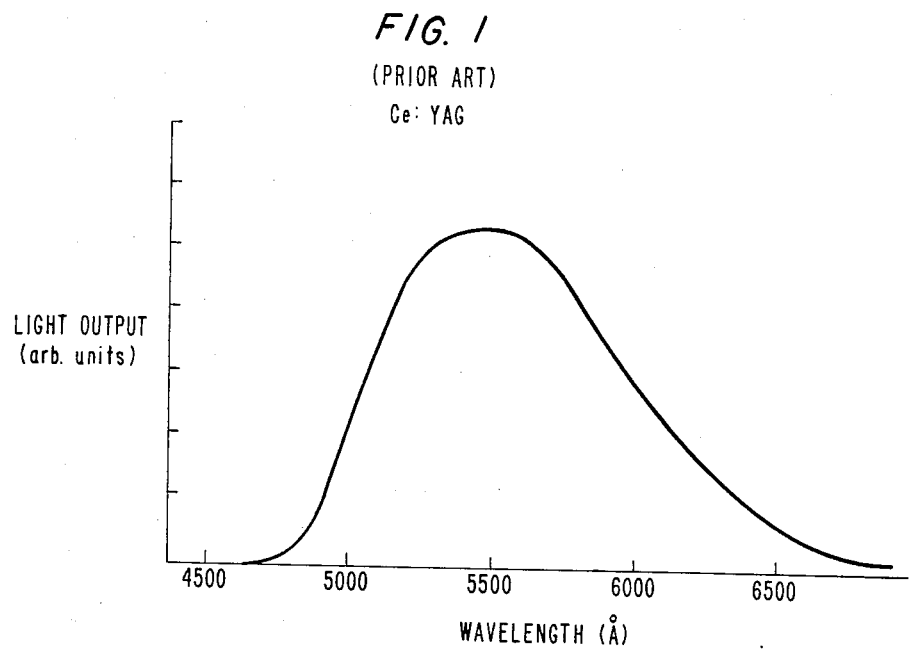
FIG. 1 shows the CL spectrum of single crystal Ce:YAG.
Figure 2:
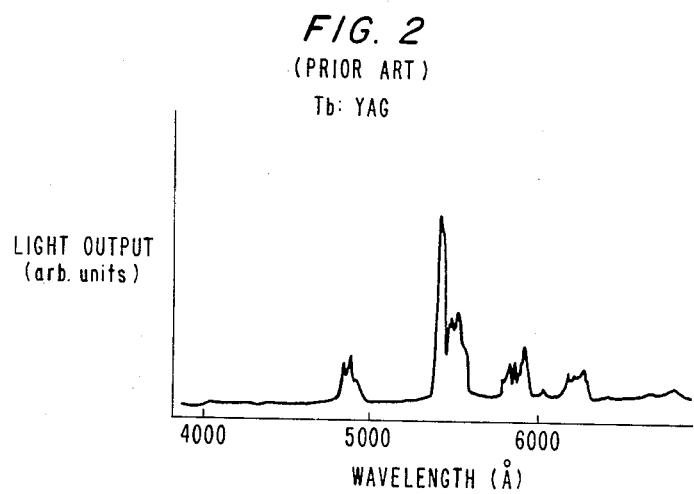
FIG. 2 shows the CL spectrum of single crystal Tb:YAG.

FIG. 1 shows the CL spectrum from a (prior art) single crystal sample of Ce:YAG. The Figure illustrates the broadband-nature of Ce emission in the 480–700 nm spectral region. Similarly, FIG. 2 shows a (prior art) CL spectrum from single crystal Tb:YAG, demonstrating that Tb has essentially a line emission spectrum in the same spectral region. It is to be noted that $Y_3Al_5O_{12}$ does not show significant luminescence in the above spectral region.

Figure 3:
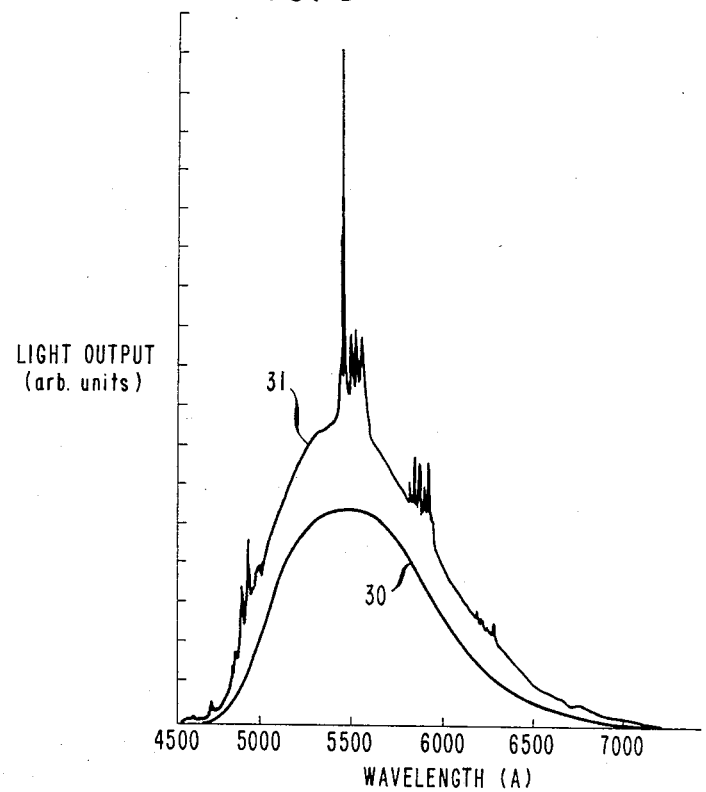
FIG. 3 gives the CL emission spectra of an exemplary single crystal Ce:Tb:YAG phosphor, and, for comparison, of Ce:YAG.

FIG. 3 shows an exemplary CL spectrum 31 of single crystal Ce:Tb:YAG, of approximate composition $Y_{2.975}Ce_{0.008}Tb_{0.017}Al_5O_{12}$, and, for comparison, the spectrum 30 of single crystal Ce:YAG, of approximate composition $Y_{2.99}Ce_{0.01}Al_5O_{12}$. Both spectra were obtained under identical conditions, and are plotted to the same scale. It is evident that spectrum 31 not only contains Tb emission lines but that the broadband Ce emission is substantially increased over spectrum 30. FIG. 3 thus exemplifies the increased Ce emission intensity of single crystal Ce:Tb:YAG, as compared to Ce:YAG. The Ce emission chromaticity of the total emission from the Ce:Tb:YAG sample corresponded to $x=0.375$, $y=0.528$ on the well-known CIE x,y Chromaticity Diagram (see, for instance, R. S. Hunter, *The Measurement of Appearance*, pp. 81–97, John Wiley, New York (1975)).

Figure 4:
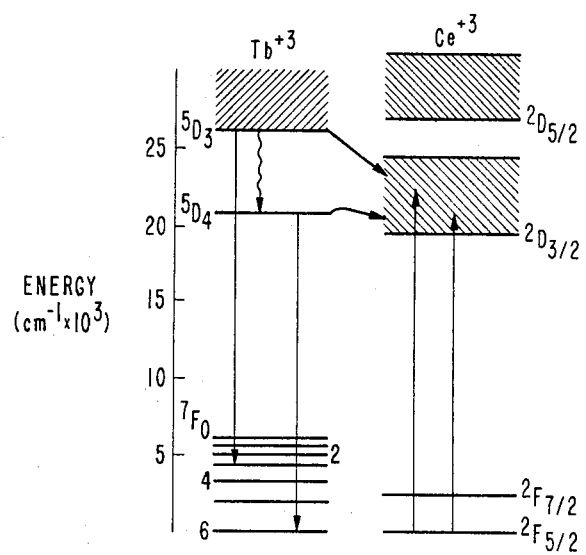
FIG. 4 shows the energy level diagrams for Ce and Tb in YAG.

FIG. 4 gives simplified energy level diagrams for Ce and Tb in YAG. A $Tb^{+3}$ ion, excited into the $^5D_3$ state, can lose energy by direct transition to a $^7F$ or the $^5D_4$ level, or, under appropriate conditions, to transfer energy to a $Ce^{+3}$ ion, raising it to the $^2D_{3/2}$ level.

Similarly, a $Tb^{+3}$ ion in $^5D_4$ can decay to a $^7F$ state, or, under the right conditions, to raise a $Ce^{+3}$ ion to $^2D_{3/2}$. The notation used is standard and well known to those skilled in the art. Herein we often do not specifically note the valence state of Ce and/or Tb, but the $+3$ valence state is intended to be implied.

Figure 5:
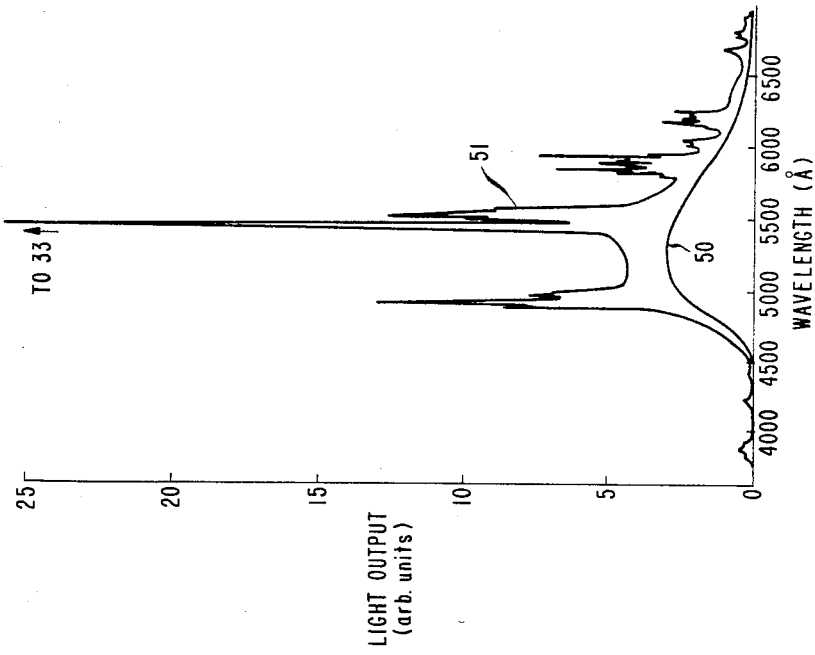
FIG. 5 gives the CL emission spectra of single crystal Ce:Tb:YAG containing Lu and Ga, and, for comparison, of Ce:YAG containing Lu and Ga.

FIG. 5 shows the spectral distribution 51 of the Ce emission from a phosphor according to the invention, namely, a single crystal Lu- and Ga-containing Ce:Tb:YAG of approximate composition $Y_{1.958}Lu_{0.93}Tb_{0.10}Ce_{0.012}Al_{4.24}Ga_{0.76}O_{12}$. For comparison, the spectrum 50 of single crystal $Y_{2.058}Lu_{0.93}Ce_{0.012}Al_{4.24}Ga_{0.76}C_{12}$ is also shown, demonstrating the enhanced broadband emission from the Tb-containing sample. The CIE chromaticity coordinates of the emission from the latter are about $x=0.322$, $y=0.578$.

Figure 6:
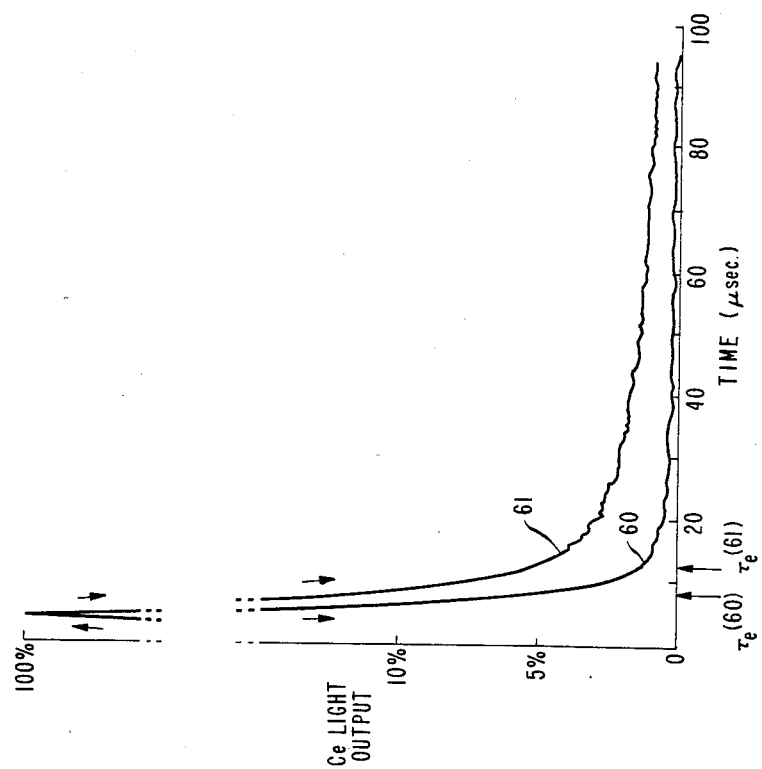
FIG. 6 shows the time resolved Ce emission intensity for exemplary single crystal Ce:Tb:YAG and Ce:YAG phosphors.

Incorporation of Tb does not only result in increased Ce emission but also in an increase in the Ce emission time, as is exemplified by the experimental results shown in FIG. 6. Curves 60 and 61 represent the normalized light output at 530 nm of single crystal $Y_{2.987}Ce_{0.013}Al_5O_{12}$ and $Y_{2.87}Ce_{0.013}Tb_{0.117}Al_5O_{12}$, respectively, as a function of time, following excitation by means of a 2 μsec 20 KV electron pulse, with $t=0$ corresponding to the termination of the excitation. The emission times $\tau_e^{(60)}$ and $\tau_e^{(61)}$, i.e., the times at which the light output has decayed to 5% of the maximum, are about 8 μsec and 12.5 μsec, for curves 60 and 61, respectively. In addition to having substantially increased emission time, the Tb-containing sample has a considerably enhanced emission tail, as compared to the Tb-free sample. Both curves 60 and 61 start at about 40% at $t=0$. The two curves have essentially identical behavior in their increasing parts as well as in the initial portion of the decay part. These parts of the curves are not shown in the Figure. Increasing and decreasing portions of the curves are identified by means of arrows adjacent to the curves.

Figure 7:
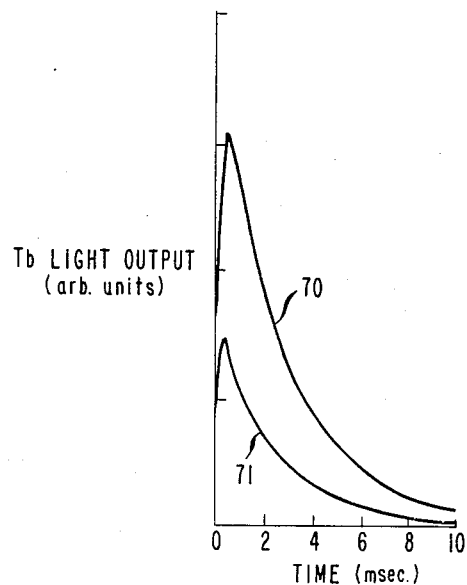
FIG. 7 presents the time-resolved Tb emission intensity for exemplary single crystal Lu- and Ga-containing Ce:Tb:YAG and Tb:YAG.

FIG. 7 shows exemplary data demonstrating that the energy transfer from Tb to Ce results in considerably reduced Tb emission and somewhat decreased Tb emission time. Curves 70 and 71 represent the Tb emission at 544 nm of single crystal $Y_{1.97}Lu_{0.93}Tb_{0.10}Al_{4.24}Ga_{0.76}O_{12}$ and $Y_{1.958}Lu_{0.93}Tb_{0.10}Ce_{0.012}Al_{4.24}Ga_{0.76}O_{12}$, respectively. The curves are plotted to the same scale, $t=0$ corresponding to the termination of the excitation, a 2 μsec 20 KV electron pulse.

Figure 8:
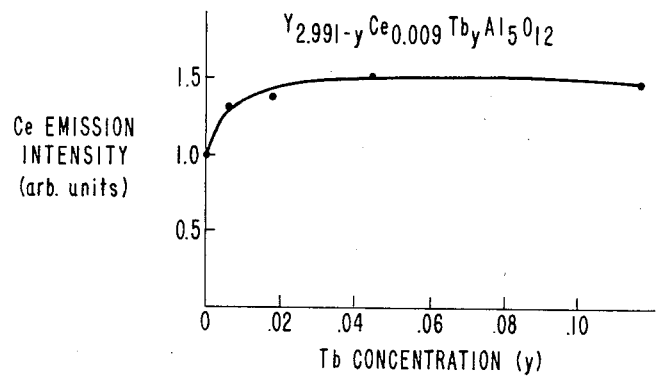
FIG. 8 shows the Ce-emission intensity of Ce:Tb:YAG as a function of Tb content.

An exemplary experimental curve of Ce emission intensity as a function of Tb content of Ce:Tb:YAG is shown in FIG. 8, indicating that the presence of a relatively small amount of Tb, e.g., corresponding to about $y=0.0025$, can produce a significant increase (typically about 10%) in the Ce emission intensity in single crystal Ce-containing YAG.

The observed increase in Ce emission from single crystal Ce:Tb:YAG is not suggested by the prior art. For instance, Japanese Pat. No. 50-97590 (op. cit.), discloses that in powder Ce:Tb:YAG the observed improvement in brightness over Ce:YAG is due to "afterglow" of Tb, with the Ce emission time in powder Ce:Tb:YAG being equal to or less than that in Ce:YAG. Since Tb has a much longer emission time in YAG than Ce, the fact that in powder Ce:Tb:YAG the Ce emission time was observed to be essentially the same as in Ce:YAG shows that no significant Tb to Ce energy transfer occurred in the prior art powder Ce:Tb:YAG.

The fact that in single crystal Ce:Tb:YAG terbium is an efficient sensitizer is of considerable practical importance. Although there exist applications of phosphors in which a line spectrum such as that of Tb:YAG is useful or even required, e.g., in holographic displays, there are other display applications, (often referred to as "refractive" displays), e.g., color displays using frame sequential filtering, or refractive displays that use different parts of a broadband spectrum to display different information, which depend on the availability of a high brightness phosphor with a broadband emission spectrum. It is in such applications that the inventive phosphor is most advantageously employed.

Doping of Ce:Tb:YAG with one or more rare earths can result in a shift of the chromaticity of the emission. In particular, this is the case for Lu-doping, as exemplified by the different CIE coordinates of the samples of FIGS. 3 and 5. The color of Lu-containing Ce:Tb:YAG makes such material of interest in, e.g., color projection TV or for video screens.

Figure 9:
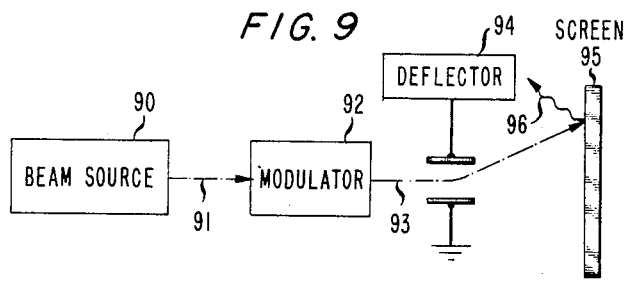
FIG. 9 schematically depicts apparatus for the practice of the invention.

Apparatus for the practice of the invention is schematically depicted in FIG. 9, wherein an excitation beam 91 is emitted by beam source 90, is amplitude modulated by modulator 92, the modulated beam 93 is appropriately deflected by deflector 94, and impinges on screen 95, with luminescent radiation 96 emitted from the excited region of the screen. The beam can be either an electron beam or electromagnetic radiation, typically in the UV.

Although the use of any method capable of producing single crystal Ce:Tb:YAG is contemplated by us, a convenient method, and indeed the one currently considered most suitable, is growth of Ce:Tb:YAG on YAG by liquid phase epitaxy (LPE). LPE has reached a high state of development in, e.g., the growth of magnetic bubble materials, and those skilled in the art of crystal growth are generally familiar with the technique. See, for instance, S. L. Blank and J. W. Nielsen, *Journal of Crystal Growth*, Vol. 17, pp. 302–311, (1972), and J. W. Nielsen, *IEEE Transactions on Magnetics*, MAG-12, pp. 327–345, (1976).

LPE has been applied to the growth of single crystal phosphor layers, including Ce:YAG and also Tb:YAG (J. M. Robertson et al, *Philips Journal of Research*, Vol. 35, pp. 354–371, (1980)). As FIG. 2 of J. M. Robertson and M. W. van Tol, *Applied Physics Letters*, Vol. 37(5), pp. 471–472, (1980), teaches, single crystal Ce:YAG of [111] orientation has maximum light output when grown at about 1010° C., and the light output of single crystal [111] Tb:YAG is approximately flat for growth temperatures between about 1010° C. and about 1040° C., with a moderate maximum for a growth temperature of at about 1070° C. These teachings suggest that [111] Ce:Tb:YAG, the preferred material, might be most advantageously grown at about 1010° C., since this growth temperature could be expected to maximize light output in the Ce band. However, we found that the highest emission efficiency of at least some inventive phosphors resulted for growth temperatures between about 1030° C. and about 1080° C. For typical materials we find that the emission efficiency of Ce:Tb:YAG with $z=w=0$ has a peak for growth at about 1065° C., and drops by about 20% at the limits of the above range. For material containing Lu and Ga the growth temperatures are typically somewhat lower.

Example 1: A melt consisting of $Y_2O_3$, $CeO_2$, $Tb_4O_7$, $Al_2O_3$, PbO, and $B_2O_3$ (9.200, 3.956, 0.374, 15.592, 1400, and 28.30 gm, respectively) was prepared in a platinum crucible in air at ambient pressure. The starting materials were commercial grade, of typically 99.999% purity. Standard LPE growth (melt temperature 1066° C., growth rate 5.36 μm/min, with substrate rotation at 60 rpm, rotation reversal after each revolution) produced a 6.44 μm thick epitaxial single crystal Ce:Tb:YAG layer on a 1.5 inch diameter [111] YAG wafer. The composition of the layer was approximately $Y_{2.891}Ce_{0.009}Tb_{0.10}Al_5O_{12}$.

The sample was mounted in a demountable CRT and exposed to a focussed beam of 20 KV electrons. The luminescent emission was analyzed with standard equipment, including a Jarell-Ash 0.5 m spectrometer, and a Hamamatsu R955 photomultiplier cooled thermoelectrically to −10° C. The emitted radiation had a spectral distribution similar to that shown in FIG. 3. The intensity of Ce emission in the 480–700 nm spectral range was about 1.5 times that of a similarly prepared single crystal Ce:YAG sample (approximate composition $Y_{2.991}Ce_{0.009}Al_5O_{12}$). By means of pulsed excitation (2 μsec pulses of 20 KV electrons, 100 Hz repetition rate) the Ce emission time is found to be about 12 μsec, which is about 1.5 times the Ce emission time observed in Ce:YAG.

Example 2: A single crystal layer of composition $Y_{1.958}Lu_{0.93}Tb_{0.10}Ce_{0.012}Al_{4.24}Ga_{0.76}O_{12}$ was grown by LPE on [111] YAG. The melt composition was $Y_2O_3=3.504$, $CeO_2=3.621$, $Tb_4O_7=0.885$, $Lu_2O_3=9.630$, $Al_2O_3=8.488$, $Ga_2O_3=13.161$, PbO=1200, and $B_2O_3=30.81$ gm. Growth temperature was 1029° C., growth rate 5.77 μm/min, and layer thickness 8.65 μm. Growth and luminescence measurement was substantially as described in Example 1. The emission spectrum was similar to the spectrum shown in FIG. 5. The Ce emission intensity was 1.48 times the Ce emission intensity of a single crystal phosphor of composition $Y_{2.058}Lu_{0.93}Ce_{0.012}Al_{4.24}Ga_{0.76}O_{12}$. The emission time exceeds that of the Tb-free material by at least 10%.

What is claimed is:

1. Visual display apparatus comprising
  (a) an excitation beam source, the beam selected from the group consisting of electron beams and beams of electromagnetic radiation comprising UV radiation,
  (b) a screen comprising single crystal phosphor material, the beam caused to be incident on the screen, and
  (c) means for deflecting the beam, and means for amplitude modulating the beam,
  CHARACTERIZED IN THAT
  (d) the phosphor material comprises single crystal material essentially having the composition $Y_{3-x-y-z}Ce_xTb_yRE_zAl_{5-w}X_wO_{12}$, with RE being one or more rare earths of the 4f-type, other than Y, Ce, and Tb, X is selected from the group consisting of Sc, Ga, and In, $0<x\leq0.06$, $0<y\leq0.5$, $0\leq z\leq2$, and $0\leq w\leq3$, wherein Tb acts as sensitizer.

2. Apparatus of claim 1, wherein the phosphor material is an epitaxial layer on a single crystal substrate.

3. Apparatus of claim 2, wherein the epitaxial layer is formed by liquid phase epitaxy.

4. Apparatus of claim 3, wherein the substrate material is substantially of composition $Y_3Al_5O_{12}$.

5. Apparatus of claim 4, wherein the substrate substantially has [111] crystalline orientation.

6. Apparatus of claim 1, wherein the beam consists substantially of ultraviolet radiation.

7. Apparatus of claim 1, wherein, for a given excitation condition, the intensity of Ce-emission in the wavelength range 480–700 nm from the single crystal material is at least 10% greater than the intensity of Ce-emission, in the same wavelength range and for the same excitation condition, from a second single crystal material, the second single crystal material containing no Tb sensitizer but otherwise having the same composition as the single crystal material.

8. Apparatus of claim 7, wherein RE is Lu and X is Ga.

9. Apparatus of claim 8, wherein $0.005\leq x\leq0.03$, $0.03\leq y\leq0.4$, $0.2\leq z\leq2$, and $0.5\leq w\leq3$.

10. Apparatus of claim 9, wherein the substrate is substantially of composition $Y_3Al_5O_{12}$ and z is about 1.6 w.

11. Apparatus of claim 7, wherein $0.005\leq x\leq0.03$, $0.03\leq y\leq0.4$, z=0, and w=0.

12. Apparatus of claim 7, further comprising means for projecting at least a part of the radiation in the 480–700 nm spectral range emitted by the phosphor onto a display screen.

13. Visual display apparatus comprising
  (a) an electron-beam source,
  (b) a screen comprising epitaxial single crystal phosphor material on a single crystal substrate, the substrate having substantially [111] crystal orientation and essentially the composition $Y_3Al_5O_{12}$, the electron beam caused to be incident on the screen, and
  (c) means for deflecting and for amplitude modulating the electron beam,
  CHARACTERIZED IN THAT
  (d) the epitaxial phosphor material is essentially of composition $Y_{3-x-y-z}Ce_xTb_yLu_zAl_{5-w}Ga_wO_{12}$, with $0.005\leq x\leq0.03$, $0.03\leq y\leq0.4$, $0\leq z\leq2$, and $0\leq w\leq3$, wherein Tb acts as sensitizer.

14. Apparatus of claim 13, wherein, for a given excitation condition, the intensity of Ce-emission all in the wavelength range 480–700 nm from the epitaxial phosphor material is at least 10% greater than the intensity of Ce-emission, in the same wavelength range and for the same excitation condition from a second epitaxial phosphor material that contains no Tb sensitizer but otherwise has the same composition as the epitaxial phosphor material.

* * * * *